United States Patent [19]

Kim et al.

[11] Patent Number: 4,901,513
[45] Date of Patent: Feb. 20, 1990

[54] COLLECTION NETTING FOR FRUITS AND NUTS TREES

[76] Inventors: Sun Y. Kim, 2384 Lancaster Ct., Hayward, Calif. 94542; Wilfred C. Frederiksen, 16881 Bolero La., Huntington Beach, Calif. 92649

[21] Appl. No.: 360,350

[22] Filed: Jun. 2, 1989

[51] Int. Cl.$^4$ ............................................. A01G 19/06
[52] U.S. Cl. ...................................................... 56/329
[58] Field of Search ..................... 56/329, 328.1, 332

[56] References Cited

U.S. PATENT DOCUMENTS

| | | | |
|---|---|---|---|
| 816,186 | 3/1906 | Roberts | 56/329 |
| 853,833 | 5/1907 | Saum, Jr. | 56/329 |
| 3,616,629 | 11/1971 | Ooka | 56/329 |

Primary Examiner—Thuy M. Bui
Attorney, Agent, or Firm—Bielen, Peterson & Lampe

[57] ABSTRACT

A netting system for fruit and nut trees in an orchard where the trees are uniformly spaced, the system having an elongated pole for each tree with a top end having a plurality of suspension lines, and a net arranged under each tree with a center opening wrapped around the pole and the trunk of the tree the net having a perimeter arranged under the outer branches of the tree with the suspension lines connecting the perimeter of the net to the top of the pole the net having lines connecting one net in to the neighboring nets to spread open the nets in the orchard without interfering with cultivation equipment or access to the trunk of the trees.

9 Claims, 2 Drawing Sheets

U.S. Patent    Feb. 20, 1990    Sheet 1 of 2    4,901,513
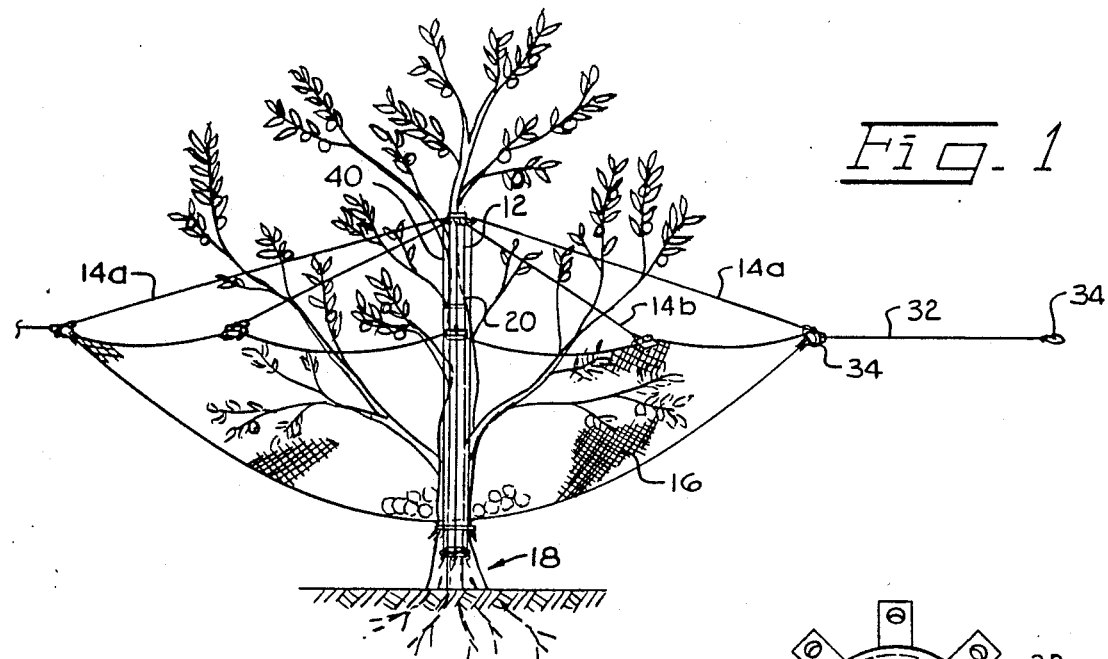
Fig. 1
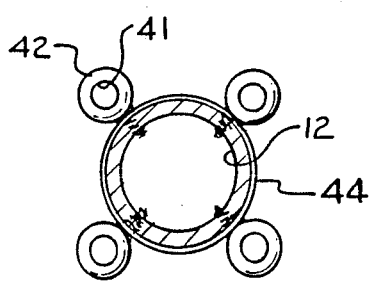
Fig. 3
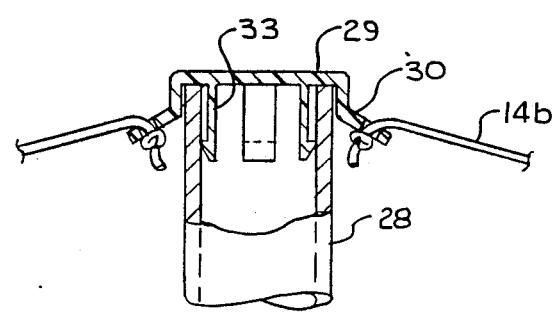
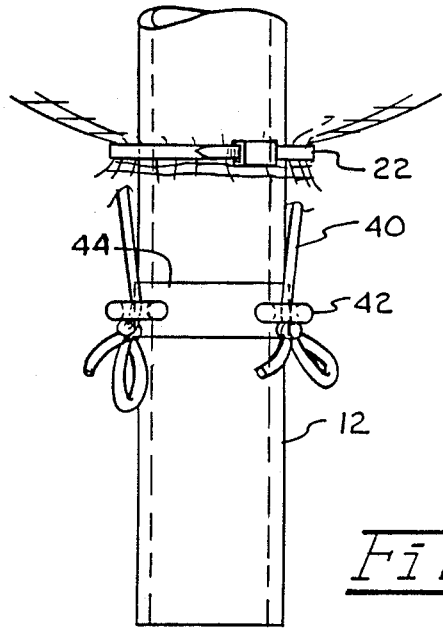
Fig. 2    Fig. 4

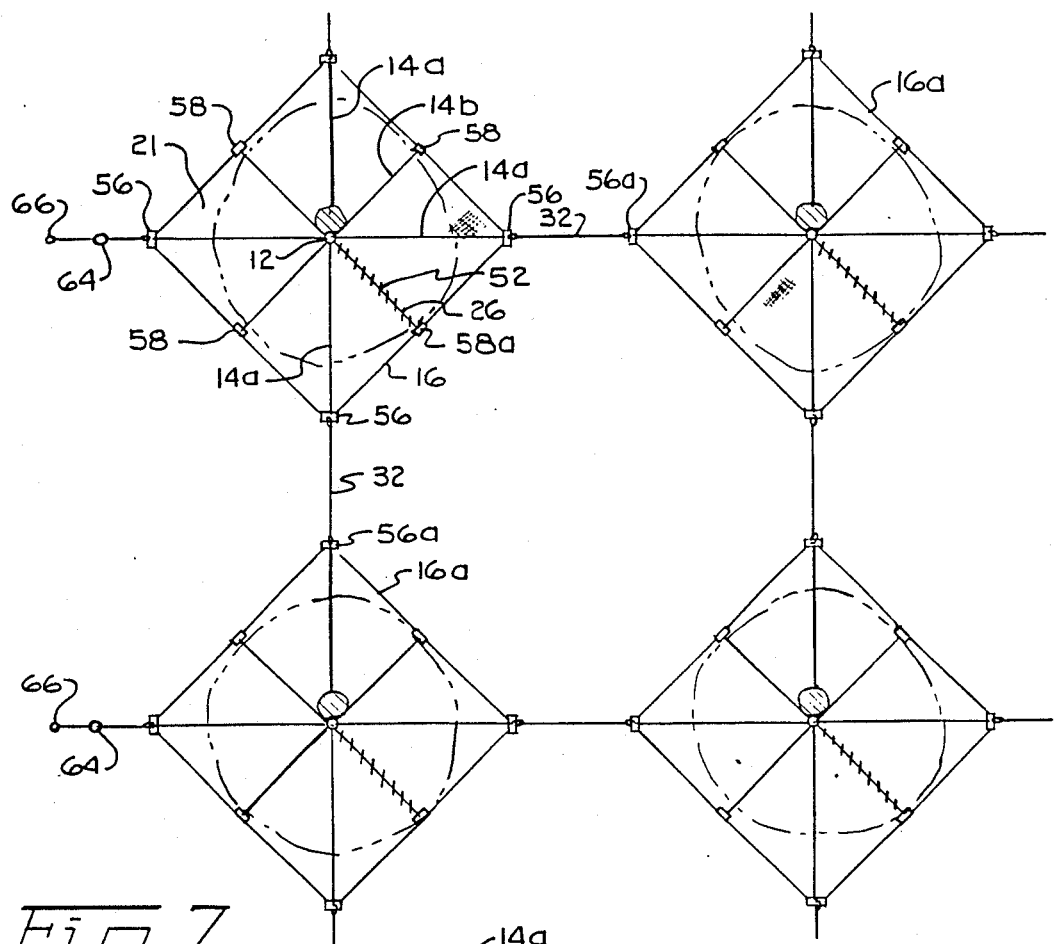
Fig_7
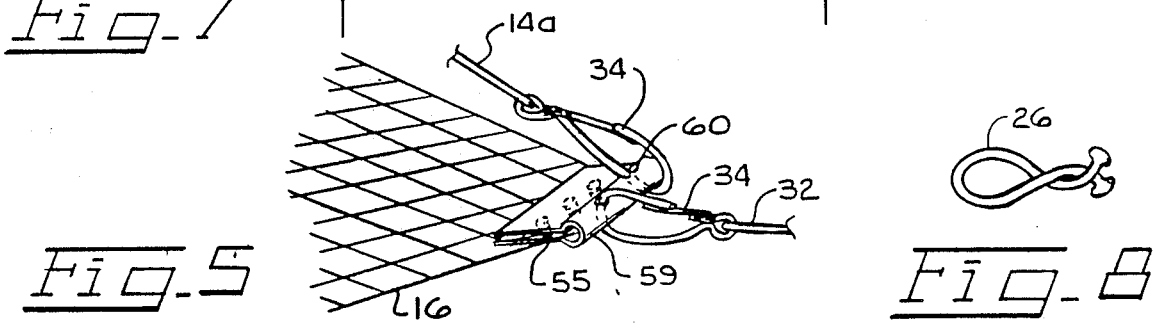
Fig_5　　Fig_8
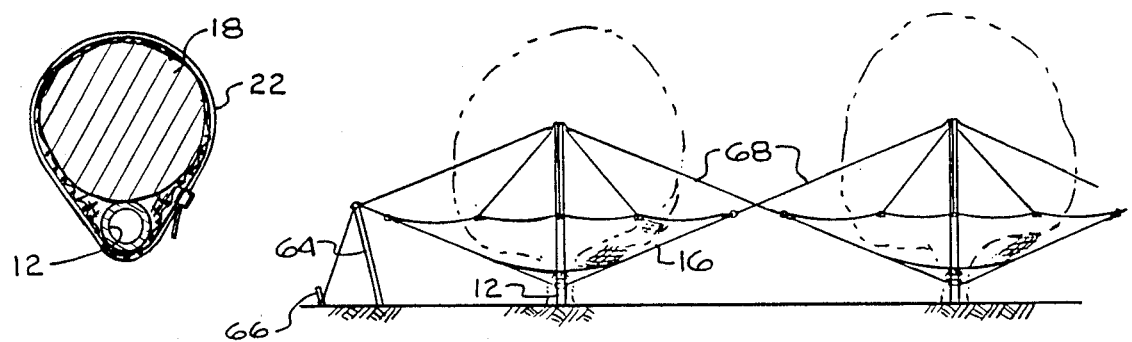
Fig_6　　Fig_9

COLLECTION NETTING FOR FRUITS AND NUTS TREES

BACKGROUND OF THE INVENTION

This invention relates to a netting system for collection of fruits or nuts from orchard trees. The use of a net to collect or gather fruits or nuts is not new. Gathering fruit or nuts in a net above the ground facilitates collection as well as prevents premature fruits from spoiling from contact with the ground. A variety of systems have been devised as is represented by the early patents of Roberts, Pat. No. 816,186, issued Mar. 27, 1906, Rauschert, Pat. No. 57,766, issued Sept. 4, 1866 and Saum, Jr., Pat. No. 853,833 issued May 14, 1907. In Roberts, a net is fastened around the trunk of the tree with the perimeter elevated by a plurality of notched stakes to form an inverted canopy. The use of stakes around the tree, inhibits cultivation, particularly mechanical cultivation used in larger orchards. Rauschert discloses a square net arranged around a tree and supported by a plurality of struts that connect to the four corners of the square net and to the trunk of the tree below the net. This system is an improvement over Roberts in that access is permitted under the tree for cultivation. In Saum, Jr. a net encircles the trunk of a tree where it is fastened with the perimeter of the nets being suspended from a plurality of suspension lines extending from the perimeter of the net to branches in the tree. Tension lines under the net are connected stakes driven in the ground. The system of Saum, Jr. requires a degree of effort and dexterity to tie the periphery of the net to suitable branches.

In devising a netting system for collection of fruits or nuts in an orchard setting, the cost of the system per tree becomes an important consideration. In determining the cost per tree such factors as the cost of the materials utilized in the system as well as the cost in labor to erect and maintain the system are to be considered. Furthermore, while a system as disclosed by one or more of the prior art references may be suitable for a limited number of trees of relatively small size, when the orchards are large and the tree sizes are great, both the problems and costs become magnified.

It is an object of the netting system of the present invention to provide a system that is suitable for orchards with large trees with components that are largely prefabricated in the shop requiring minimal installation time in the field. The system utilizes a suspension and tension means that maintains the net well above the ground and allows for passage of mechanical cultivation equipment under the net system and around the trees. The system for suspending the net does not depend upon the fortuitous location of branches of sufficient strength to hold the net and its contents. The netting system of this invention utilizes tension lines to interconnect nets of adjacent trees such that the net can be widely spread under the tree to which it is associated.

With each net unit under a tree being connected to its four adjacent neighboring trees, the net system provides an interconnected netting system for the entire orchard. The net units for trees on the perimeter of the orchard have the perimeter facing corners of the net staked to the ground. By using inexpensive spring connectors to connect the perimeter of the net to the center pole, and to interconnect the adjacent nets, the nets can be easily disconnected for cleaning of debris and repair.

SUMMARY OF THE INVENTION

This invention relates to a netting system for collection of fruit or nuts in orchards of uniformly spaced trees. In devising a netting system for collection of fruit or nuts, the primary consideration is the cost, particularly where the orchards include thousands of trees. While the system of this invention was devised for collection of macadamia nuts, the system may be used for collection of other nuts and fruit, particularly where the trees are large and it is desired to maintain the collection nets around the trees at all times while permitting free access under the trees.

In the netting system of this invention, an elongated pole is positioned against the tree and is attached thereto by straps. A large square of netting formed of two panels is sewn to the center, and wrapped around the pole and tree, with the center of the net secured to the pole above the ground by a plastic strap. The open split, which enables the net to encompass the tree is subsequently closed by a plurality of plastic twists. The four corners of the net and the centers of the four sides of the net are equipped with plastic hinge clips to which suspension lines are attached, thus providing eight positions around the perimeter of the netting for supporting the net. The top of the pole has a cap with eight evenly eyelets on tabs projecting from the pole. Connected to every other eyelet is a suspension line which is connected to one of the clips at the center of each net edge. Threaded through the remaining eyelets are similar suspension lines that connect each of the four corners of the net to the top of the pole. The corner suspension lines thread through the eyelets of the cap tabs and have extensions that continue down the side of the pole. The extensions comprise draw lines that allow adjustment of the net and are knotted to four eyescrews on a band on the lower portion of the pole below the strap that secures the center of the net to the pole. Additional tension lines extend from each of the four corners of the net to the nearest corners of the nets on the next adjacent trees. When the draw line is pulled the corners of the net are raised preferably to a height that enables persons and vehicles to pass under the interconnecting lines between the trees. With both the net and the supporting lines being raised above the ground normal cultivation and fertilizing activities can be conducted without interference of the netting system. The ends of the corner lines on the trees that form the perimeter of the orchard connect to lines that are attached to anchoring stakes in the ground.

By using inexpensive monofilament netting, nylon cord and inexpensive plastic and metal fittings the cost per tree can be maintained at a minimum. To gather the collected nuts or fruit, one or two of the adjacent lines can be detached from the perimeter net clip to lower the edge of the net and gather the fallen fruits or nuts that have collected in the net. Alternately, the seam between the net panels can be opened by untying the ties to open a section at the center of the net allowing the nuts to drop through the opening for collection.

DETAILED DESCRIPTION OF THE DRAWINGS

FIG. 1 is a side elevational view of one of the suspension nets in the netting system installed under a typical tree.

FIG. 2 is an enlarged side elevational view partially in cross section of the net pole of the suspension net in FIG. 1.

FIG. 3 is a top view of the cap for the pole of FIG. 2.

FIG. 4 is a cross sectional view of the pole without the draw lines taken on the lines 4—4 in FIG. 2.

FIG. 5 is a partial perspective view of the net, broken away at the corner showing clip connectors.

FIG. 6 is a cross sectional view of the pole and tree showing strap connections.

FIG. 7 is a top schematic view of the netting system for a plurality of trees.

FIG. 8 is a perspective view of a typical net tie.

FIG. 9 is a side schematic view of an alternate suspension means.

DETAILED DESCRIPTION OF THE PREFERRED EMBODIMENTS

Referring now to the drawings, the netting system of this invention is shown in use for a macadamia orchard. The use of a netting system for macadamia nuts is desirable since the macadamia tree produces nuts throughout the year and there is therefore no single time of harvest. The trees in an orchard are planted in uniformly spaced rows of about 25 to 35 feet between the rows and 18 to 20 feet between the trees in a row. The trees start producing after six or seven years and reach full production in approximately their fifteenth year. The trees can exceed fifty feet in height but are generally maintained at a lower height in orchard plantings.

As shown in FIGS. 1 and 2, the netting system includes a support pole 12 from which a plurality of suspension lines 14a and 14b support a net 16 on the underside of a tree 18. The pole 12 is secured to the tree 18 by a plurality of plastic cable straps 20 and the pole 12 is selected to have a height approximately two-thirds the height of the tree. The net is sized such that the perimeter of the net spreads under the outer branches of the tree.

The net 16 is preferably an inexpensive monofilament net that is square in configuration as shown and is fabricated from two panels 21 sewn together along the long edge of each panel up to the center point of the joined panels to allow the split net to encircle the trunk of the tree. During installation, the split is joined by a plurality of plastic ties 26 and the center portion is gathered and tied around the trunk using a cable strap 22.

The net 16 is suspended by eight suspension lines 14a and 14b which connect the four corners and the middle of the four edges of the square shaped net to the distal end 28 of the pole 12. The top of the pole has a cap 29 with a series of eight tabs 30 with eye holes 31 uniformly spaced around the cap 29 for connection of the suspension lines. The cap protects the top of the pole and has prongs 33 to engage the end of the pole. The support pole 12 is preferably hollow bamboo wood and the prongs 33 of the cap engage the inside of the pole. Because it is light in weight and secured to the tree by several cable straps 20, the pole need not be driven into the ground but may be set on the top of the ground without disturbing the sensitive roots of the trees. In order to properly spread the net under a tree, the four corners of the net each have a tension line 32 with a spring clip 34 at each end that interconnects the corner of the net on the next adjacent tree. The four suspension lines 14a that connect to the corners of the net also have a spring clip 34 and have a draw line 40 which is an extension of the suspension line that is threaded down through one of the eye holes 31 in the upper cap 29 and through a corresponding eyelet 41 of an eye screw 42 on a lower metal band 44 arranged below the net 16 for easy access. Each draw line is knotted to one of the lower eye screws 42 and the ends of the lines are coiled to keep the lines above the ground. The metal band 44 through which the eyescrews 42 screw into the wood of the hollow pole prevent the wood from splitting.

Referring to the schematic plan view of the net system in FIG. 7, depending on the tree size, the net 16 is sized in a twenty to twenty eight foot square and assembled from two panels of half the finished size that are sewn together as stated. A center star cut 50 allows the center of the net to encircle both the pole and the trunk of a tree for fastening by the strap 22 to the center of the spread net. The open segment 52 is stitched together in the field after the net is placed around the tree using the plastic ties 26, which are shown in the detail of one of the ties in FIG. 8.

To prevent the net from tearing where the lines are connected to the net, the net is equipped with plastic hinge clips 56 at each of the four corners and hinge clips 58, at the middle of three of the sides before field installation of the net. A fourth hinge clip 58a is installed over the field stitching after the net has been arranged around the tree. The hinge clips 58 have a prong and socket engagement means 55 shown in dotted line in FIG. 5 to lock the clip over a segment of the net, thereby reducing the stress on the net from the lines. The clips 56 have several holes 60 for attachment of the suspension lines, and where appropriate, the corner tension lines.

The four suspension lines 14b which connect the hinge clips 58 at the middle of the sides of the net to the eye cap 29 at the distal end of the pole have a predetermined length and are secured by knotting the ends of the lines through the eye holes 31 on the cap tabs 30 and clipping a spring clip 34 at the end of the line to one of the edge hole 60 in the hinge clips. The four suspension lines 14b which connect the hinge clips 56 at the corners of the net to cap 29 at the top of the pole 12 are connected by spring clips 34 at the ends of the lines to the hinge clips 56 and are threaded through the eyeholes 31 of the cap tabs 30 and knotted to the eyelet of the eye screws 42 on the lower band 44. If desired, the top cap 29 can be replaced with a band with eight eye screws screwed around the top of the pole as an alternate to the specially fabricated cap. As mentioned the draw line is tied or knotted after the tension in the lines 14b and 32 have been adjusted.

To properly spread each net wide under the tree the corners of each net are connected to the corner of the proximal neighboring net under the next adjacent tree. Preferably, the tension line 32 has a spring clip 34 at each end and is used to engage the corner hinge clip 56 on one net and an identical corner clip 56a at the corner of the neighboring net 16a. The tension lines are connected when the draw lines are relaxed allowing easy access to the corners of the net. The tension lines 32 are adjusted in length such that when the draw lines 40 are pulled, the nets will have an optimal configuration for capturing nuts that fall from the trees. The use of spring clips at the ends of the suspension and tension lines allows for easy disconnection of the net from the lines for cleaning the net of fallen debris or for pruning the tree.

The netting system of this invention is designed to provide a collection net for each tree in an orchard by an arrangement that is both effective and inexpensive. Because costs can quickly mount when equipping thousands of trees with collection nets, the design of this invention preferably uses components that are inexpensive and readily obtainable. For example, depending on the height of the tree, the pole might be from twenty to forty feet in length and while preferably of natural bamboo, may be of plastic, aluminum or other fabricated material. The preferred hinge clips and spring clips are fabricated from plastic. Where costs permit the suspension lines may have spring clips at both of their ends for convenient connection to the hinge clips and the eye holes of the cap tabs. The eye screws have one-half inch eyelets and are conventional hardware items. The plastic net is preferably of a monofilament type with one quarter inch to one-half inch mesh openings. The net is supplied in large rolls of five or seven foot widths and cut and stitched to size. The straps for securing the pole to the tree and closing the net opening at the center of the net are conventional cable ties of nylon or other weather durable material. The suspension lines and tension lines are quarter inch nylon rope or woven cord also furnished in large reels. Each net module is prefabricated in the shop to near completion to minimize the time and expense of field installation. As described, the system was designed for large nut trees such as the macadamia. However, the system can be scaled down in size for use on smaller fruit or nut trees.

Nuts can be collected by undoing the plastic ties that close the net split and shifting the nuts over to the opening by jostling or shaking the net to displace the nuts to the opening where they are collected by a collection boom with a belt or pneumatic suction conveyor. Alternately, a portion of the net can be lowered by disconnecting the tension lines and suspension lines from a segment of the perimeter of the net. The use of the spring clips at the ends of the lines simplifies this task.

The net system is designed such that the tension cables are elevated well above the ground to allow vehicles and cultivation equipment to pass under the trees without interference of the net system. The trees on the perimeter of the orchard can have somewhat longer tension lines connected to poles 64 and stakes 66 that are driven into the ground. While the structure and arrangement of the net system shown in FIGS. 1 and 7 is preferred, there may be certain alternate arrangements that may be employed. For example, the tension lines 32 may be replaced by elongated corner suspension lines 68 that connect to the corner of the neighboring net instead of the immediate net as shown schematically in FIG. 9. In such a system the netting system is substantially identical to the preferred embodiment in all other respects.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A netting system for collection of fruits or nuts in an orchard having trees uniformly spaced in rows and for each tree a net unit comprising:
    an elongated pole, wherein each tree has a trunk and branches and the pole has means for securing the pole to the trunk of the tree in an upright position with the pole having a distal end extending up into the branches of the tree;
    a net having a center portion with an opening the net having means for securing the center portion around the pole and the trunk of the tree, the net having a perimeter edge extending below the outer branches of the tree;
    a plurality of suspension lines each line being connected to the distal end of the pole and connected to the perimeter edge of the net, wherein the net is aerially suspended under the branches of the tree by the suspension lines; and
    a plurality of tension lines each line having first and second ends with the first end connected to the perimeter edge of a net and with the second end connectable to the proximal perimeter edge of a net arranged under an adjacent tree wherein the tension lines are of a length that spreads the net under the tree, with each tree in the orchard having a similar net unit interconnected with adjacent nets to form the net system.

2. The netting system of claim 1 wherein certain of the suspension lines each connect at a place on the perimeter edge of the net where each of the tension lines connect.

3. The netting system of claim 2 wherein each suspension line that connects to the perimeter edge of the net where a tension line connects have a draw line extension and the pole has draw line means for enabling the draw line extension to be manually pulled to raise the perimeter of the net and add tension to the tension line, the draw line means including an eye member on the top of the pole and a tie member on the lower side of the pole.

4. The netting system of claim 3 wherein the suspension lines not having a draw line extension are fixedly connected to the top of the pole.

5. The netting system of claim 4 wherein the top of the pole has a cap and the cap includes a perimeter flange with a plurality of eye holes through which the draw line extensions pass.

6. A netting system for collection of fruits or nuts in an orchard having trees uniformly spaced in rows and for each tree a net unit comprising:
    an elongated pole, wherein each tree has a trunk and branches and the pole has means for securing the pole to the trunk of the tree in an upright position with the pole having a distal end extending up into the branches of the tree;
    a net having a center portion with an opening the net having means for securing the center portion around the pole and the trunk of the tree, the net having a perimeter edge extending below the outer branches of the tree;
    a plurality of first suspension lines each line being connected to the distal end of the pole and connected to the perimeter edge of the net, wherein the net is aerially suspended under the branches of the tree by the suspension lines, and
    a plurality of second suspension lines each line being connected to the distal end of the pole with an end connectable to the proximal perimeter edge of a net arranged under an adjacent tree wherein the second suspension lines are of a length that spreads the net under the tree, with each tree in the orchard having a similar net unit interconnected with adjacent nets by the second suspension lines to form the net system.

7. The netting system of claim 6 wherein each of the second suspension lines have a draw line extension and the pole has draw line means for enabling the draw line extension to be manually pulled to raise the perimeter of the net on the net under an adjacent tree, the draw line means including an eye member on the top of the pole and a tie member on the lower side of the pole.

8. The netting system of claim 7 wherein the suspension lines not having a draw line extension are fixedly connected to the top of the pole.

9. The netting system of claim 8 wherein the top of the pole has a cap and the cap includes a perimeter flange with a plurality of eye holes through which the draw line extension pass.

* * * * *